United States Patent
Kasahara et al.

(10) Patent No.: US 9,472,821 B2
(45) Date of Patent: Oct. 18, 2016

(54) OPERATION METHOD OF POLYMER ELECTROLYTE FUEL CELL SYSTEM AND POLYMER ELECTROLYTE FUEL CELL SYSTEM

(75) Inventors: Hideo Kasahara, Osaka (JP); Hiroshi Ishikawa, Osaka (JP); Takeou Okanishi, Nara (JP); Yoichiro Tsuji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 564 days.

(21) Appl. No.: 13/818,286

(22) PCT Filed: Oct. 24, 2011

(86) PCT No.: PCT/JP2011/005942
§ 371 (c)(1),
(2), (4) Date: Feb. 21, 2013

(87) PCT Pub. No.: WO2012/063414
PCT Pub. Date: May 18, 2012

(65) Prior Publication Data
US 2013/0164640 A1 Jun. 27, 2013

(30) Foreign Application Priority Data
Nov. 12, 2010 (JP) .................. 2010-253801

(51) Int. Cl.
*H01M 8/04* (2016.01)
*H01M 8/10* (2016.01)
(52) U.S. Cl.
CPC ..... *H01M 8/04835* (2013.01); *H01M 8/04126* (2013.01); *H01M 8/04238* (2013.01); *H01M 8/04664* (2013.01); *H01M 8/04671* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2005/0139402 | A1 | 6/2005 | Yamashita |
| 2007/0003805 | A1 | 1/2007 | Sugawara et al. |
| 2007/0099040 | A1 | 5/2007 | Morita et al. |

(Continued)

FOREIGN PATENT DOCUMENTS

| | | |
|---|---|---|
| JP | 08-315843 A | 11/1996 |
| JP | 2001-325974 A | 11/2001 |

(Continued)

OTHER PUBLICATIONS

International Search Report mailed Jan. 31, 2012 issued in corresponding International Application No. PCT/JP2011/005942.

(Continued)

*Primary Examiner* — Daniel Gatewood
(74) *Attorney, Agent, or Firm* — McDermott Will & Emery LLP (57) ABSTRACT

An operation method of a polymer electrolyte fuel cell system including an anode (3) supplied with a fuel gas containing hydrogen, a cathode (4) supplied with an oxidizing gas containing oxygen, and a polymer electrolyte membrane (5) sandwiched between the anode (3) and the cathode (4), comprises supplying to the anode (3) the fuel gas humidified with a higher level than the oxidizing gas to cause the anode (3) to have a humidified state with a higher level than the cathode (4), in start-up of the polymer electrolyte fuel cell system.

8 Claims, 6 Drawing Sheets

(56) References Cited

U.S. PATENT DOCUMENTS

| | | | |
|---|---|---|---|
| 2008/0152972 A1* | 6/2008 | Igarashi | H01M 8/04022 429/410 |
| 2009/0110993 A1* | 4/2009 | Backhaus-Ricoult et al. | 429/32 |
| 2009/0263688 A1* | 10/2009 | Yajima | H01M 8/04186 429/413 |
| 2010/0233554 A1 | 9/2010 | Nogi et al. | |

FOREIGN PATENT DOCUMENTS

| | | | |
|---|---|---|---|
| JP | 2003-142132 A | | 5/2003 |
| JP | 2003142132 A | * | 5/2003 |
| JP | 2004-127548 A | | 4/2004 |
| JP | 2005-209547 A | | 8/2005 |
| JP | 2006-179345 A | | 7/2006 |
| JP | 2007-200726 A | | 8/2007 |
| JP | 2007-242449 A | | 9/2007 |
| JP | 2007-287545 A | | 11/2007 |
| JP | 2008027606 A | * | 2/2008 |
| JP | 2008-282737 A | | 11/2008 |
| JP | 2009-193855 A | | 8/2009 |
| WO | 99/34465 A1 | | 7/1999 |

OTHER PUBLICATIONS

Office Action issued in Chinese Application No. 201180042154.1 dated Feb. 3, 2015, with English translation.
Extended European Search Report issued in European Application No. 11840534.9 dated Mar. 25, 2014.

* cited by examiner

OPERATION METHOD OF POLYMER ELECTROLYTE FUEL CELL SYSTEM AND POLYMER ELECTROLYTE FUEL CELL SYSTEM

RELATED APPLICATIONS

This application is the U.S. National Phase under 35 U.S.C. §371 of International Application No. PCT/JP2011/005942, filed on Oct. 24, 2011, which in turn claims the benefit of Japanese Application No. 2010-253801, filed on Nov. 12, 2010, the disclosures of which Applications are incorporated by reference herein.

TECHNICAL FIELD

The present invention relates to an operation method of a polymer electrolyte fuel cell system and the polymer electrolyte fuel cell system. Particularly, the present invention relates to an operation method and system for preventing poisoning of an anode.

BACKGROUND ART

Typically, fuel cells are configured to generate electricity through an electrochemical reaction using a fuel gas and an oxidizing gas. The fuel cells have high power generation efficiency, and exhaust clean gases which can minimize negative effects on environments. Because of this, in recent years, it has been expected that the fuel cells are utilized for various uses such as power supplies for electric power generation and power supplies for automobile which provide less pollution. The fuel cells are categorized into plural kinds depending on the kinds of electrolytes which are components of the fuel cells. For example, there are known a phosphoric-acid fuel cell, a molten carbonate fuel cell, a solid oxide fuel cell, a polymer electrolyte fuel cell, etc. Among these fuel cells, the polymer electrolyte fuel cell can be operated at a low temperature of about 80 degrees C., and therefore is easily treated as compared to the fuel cells of another kinds. In addition, the polymer electrolyte fuel cell (PEFC) provides a very high output density. Under the circumstances, the utilization of the polymer electrolyte fuel cell is much expected.

Typically, the polymer electrolyte fuel cell includes a polymer electrolyte membrane having a proton conductivity, and a pair of electrodes which are an anode and a cathode provided such that they sandwich the polymer electrolyte membrane and face main surfaces of the polymer electrolyte membrane, respectively. In this way, the polymer electrolyte membrane and the pair of electrodes sandwiching the polymer electrolyte membrane constitute a membrane electrode assembly. A cell having a structure in which the membrane electrode assembly is sandwiched between separators is a minimum power generation unit. In the fuel cell, a fuel gas such as hydrogen or hydrocarbon is supplied to the anode, while an oxidizing gas such as oxygen or air is supplied to the cathode. Thus, an electrochemical reaction is caused to proceed in a three-phase interface among the gases, the electrolyte and the electrodes and electricity generated through the reaction is taken out.

As the polymer electrode membrane, an ion exchange resin having a skeleton which is mainly composed of a fluorine compound, or an ion exchange resin having a skeleton composed of hydrocarbon is used. These resins deteriorate with a long-period and continued operation of the fuel cell, and sulfur-based substance ions, fluoride ions, etc., are generated as substances resulting from decomposition. Among these substances, if the sulfur-based ions stay inside of the electrolyte membrane, the anode or the cathode of the fuel cell may be poisoned and an electrode effective area may be reduced. Specifically, the generated sulfur-based component is adsorbed onto a surface of a precious metal such as platinum constituting each electrode (to be precise, its catalyst) and as a result, the effective electrode area is reduced, which impedes the electrochemical reaction. Because of this, polarization of the cell increases and cell performance is degraded.

As a solution to this, there is a method for addressing degradation of the cell performance due to impurity ions. For example, Patent Literature 1 discloses a method in which water obtained by separating a gaseous component from an off-gas is caused to pass through an ion exchange resin to remove the impurity ions, and the resulting water is supplied to the anode, thus lowering an acid ion concentration in the water within the fuel cell and suppressing a corrosion of a metal member. Patent Literature 2 discloses a method of using a regenerant to regenerate an ion exchange resin having a degraded capability. Furthermore, Patent Literature 3 discloses a method in which a concentration of impurity ions contained in water generated during a power generation operation is measured, and a fuel cell is shut down and, for example, washed, when the measured concentration is high, thereby realizing a stable operation of a fuel cell for a long period of time.

Patent Literature 4 discloses a fuel cell power generation apparatus which humidifies a fuel cell using a humidified raw material gas at start-up. More specifically, the raw material gas humidified by a steam is supplied to the fuel cell through a reformer in a low temperature state. At a time point when the humidified raw material gas with a predetermined flow rate has been supplied, a temperature of the reformer is increased. Thus, a hydrogen-rich reformed gas derived by reforming the raw material gas is supplied to the fuel cell.

CITATION LISTS

Patent Literature

Patent Literature 1: Japanese Laid-Open Patent Application Publication No. 2008-282737
Patent Literature 2: Japanese Laid-Open Patent Application Publication No. 2007-287545
Patent Literature 3: Japanese Laid-Open Patent Application Publication No. 2004-127548
Patent Literature 4: Japanese Laid-Open Patent Application Publication No. 2005-209362

SUMMARY OF THE INVENTION

Technical Problem

As described above, it is known that the electrode (to be precise, its catalyst) of the fuel cell is poisoned by the sulfur-based substances. After further intensive study, the present inventors discovered that the sulfur-based substances which were present or emerged within the fuel cell during shut-down may poison the electrode at "start-up" of the fuel cell. However, the methods disclosed in the above Patent Literatures 1~3 are not intended to prevent the poisoning due to the sulfur-based substances which were present or emerged within the fuel cell during shut-down. For example, in the method disclosed in the Patent Literature 1, the sulfur-based substance ions contained in the water generated from the off-gas can be reduced. However, poisoning due to the sulfur-based substance ions eluted from the electrolyte membrane during shut-down of the fuel cell or poisoning due to the sulfur-based substances contained in the air remaining in the anode cannot be prevented from occurring. The methods disclosed in Patent Literatures 2 and 3 are intended to restore the fuel cell having degraded performances, and therefore, are unable to prevent degradation of the performance from occurring.

The fuel cell power generation apparatus disclosed in Patent Literature 4 is required to include a humidifier configured to humidify the raw material gas with a low temperature. Therefore, in this fuel cell power generation apparatus, it is difficult to increase a water content in the raw material gas, which cannot enhance a humidification efficiency sufficiently.

The present invention has been developed under the above stated circumstances, and an object of the present invention is to provide an operation method of a polymer electrolyte fuel cell system which is capable of preventing poisoning of an electrode due to the sulfur-based substances in start-up, and the polymer electrolyte fuel cell system.

Solution to Problem

A method of operating a polymer electrolyte fuel cell system of the present invention, including an anode supplied with a fuel gas containing hydrogen, a cathode supplied with an oxidizing gas containing oxygen, and a polymer electrolyte membrane sandwiched between the anode and the cathode, comprises in start-up of the polymer electrolyte fuel cell system, supplying to the anode the fuel gas humidified with a higher level than the oxidizing gas to cause the anode to have a humidified state with a higher level than the cathode.

The method may comprise: in the start-up, supplying to the anode the fuel gas humidified with the higher level than the oxidizing gas and an oxygen gas, to cause the anode to have the humidified state with the higher level than the cathode.

The method may comprise when it is determined that the anode has been poisoned by sulfur, supplying to the anode the fuel gas humidified with the higher level than the oxidizing gas and an oxygen gas, to cause the anode to have the humidified state with the higher level than the cathode, in next start-up after it is determined that the anode has been poisoned by the sulfur.

The method may comprise in the start-up, feeding water to the anode to cause the anode to have the humidified state with the higher level than the cathode.

The method may comprise in the start-up, supplying humidified air to the anode to cause the anode to have the humidified state with the higher level than the cathode.

The method may comprise in the start-up, causing the anode to have the humidified state with the higher level than the cathode, in a state in which the anode is caused to have a predetermined electric potential higher than a standard hydrogen electrode potential using an outside power supply.

The method may comprise in a standby state of the polymer electrolyte fuel cell, causing the anode to have the humidified state with the higher level than the cathode.

The method may comprise: causing the anode to have the humidified state with the higher level than the cathode, in a state in which the polymer electrolyte fuel cell system is operated with a predetermined power output lower than a rated power generation output.

A polymer electrolyte fuel cell system of the present invention including an anode supplied with a fuel gas containing hydrogen, a cathode supplied with an oxidizing gas containing oxygen, and a polymer electrolyte membrane sandwiched between the anode and the cathode, comprises a humidifier section for humidifying the anode; and a control section for controlling an operation of the humidifier section; wherein the control section is configured to cause the humidifier section to make the fuel gas humidified with a higher level than the oxidizing gas and supply the humidified fuel gas to the anode, to cause the anode to have a humidified state with a higher level than the cathode, in start-up of the polymer electrolyte fuel cell system.

In the polymer electrolyte fuel cell system, the polymer electrolyte membrane may include an ion exchange resin having a skeleton of a fluorine-based compound or hydrocarbon.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

Advantageous Effects of the Invention

In accordance with an operation method of a polymer electrolyte fuel cell system and the polymer electrolyte fuel cell system of the present invention, it is possible to prevent an electrode from being poisoned by a sulfur-based compound in start-up.

DESCRIPTION OF THE EMBODIMENTS

First of all, a basic principle of an operation method of a polymer electrolyte fuel cell system (hereinafter appropriately referred to as "fuel cell system") of the present invention will be described. As operation states of the fuel cell system, there are a power generation operation state in which the fuel cell system is able to output a rated voltage, a stand-by state in which all of the components are in a stopped (deactivated) state, a start-up operation state in which the fuel cell system is started-up from the standby state to the power generation operation state, and a shutdown operation state in which the fuel cell system is shifted from the power generation operation state to the standby state. Hereinafter, the power generation operation state, the standby state, the start-up operation state, and the shut-down operation state will be expressed as "power generation mode", "standby mode", "start-up mode" and "shutdown mode," respectively.

Principle of Invention

Within the fuel cell, there exist sulfur-based substances contained in air supplied as an oxidizing gas or sulfur-based substance ions which are eluted due to degradation of the polymer electrolyte membrane. The sulfur-based substances or the sulfur-based substance ions cause an electrochemical redox reaction as represented by the following formula with a precious metal based catalyst (hereinafter platinum (Pt) is recited as a representative) constituting an anode or a cathode.

$$Pt\text{-}Sads + 3H_2O \rightleftharpoons Pt + SO_3 + 6H^+ + 6e^- \qquad (1)$$

(Pt–Sads) is sulfur absorbed to Pt which is an electrocatalyst $$Pt\text{-}Sads + 4H_2O \rightleftharpoons Pt + SO_3^{2-} + 8H^+ + 8e^- \qquad (2)$$

An oxidization peak potential (standard hydrogen electrode potential, hereinafter referred to as "vs. NHE") in generation of sulfur trioxide ($SO_3$) in a right side of the above formula (1) is 0.890V vs. NHE. If the electric potential is equal to or higher than 0.890V vs. NHE, a rightward oxidization reaction in the formula (1) is promoted, while if the electric potential is equal to or lower than 0.890V vs. NHE, a leftward reduction reaction in the formula (1) is promoted. An oxidization peak potential in generation of sulfite ion ($SO_3^{2-}$) in the right side of the above formula (2) is 1.090 Vs NHE. If the electric potential is equal to or higher than 1.090V vs. NHE, a rightward oxidization reaction in the formula (2) is promoted, while if the electric potential is equal to or lower than 1.090V vs. NHE, a leftward reduction reaction in the formula (2) is promoted. An equilibrium in the above stated redox reaction depends on a temperature. The leftward reduction reaction tends to be predominant when the temperature is higher.

By comparison, in the start-up mode or in the power generation mode, a fuel gas containing hydrogen is supplied to the anode of the fuel cell, and the electric potential of the anode is about 0V vs. NHE. Therefore, in the formula (1) and the formula (2), the leftward reduction reaction is predominant, which facilitates adsorption of the sulfur onto the platinum catalyst. Especially, in the power generation mode, the temperature of the fuel cell is higher, which facilitates adsorption of the sulfur onto the platinum catalyst due to the reduction reaction.

In an electric potential of the cathode in the polymer electrolyte fuel cell is about 1.0 V vs. NHE even in an open circuit voltage, and is lowered to 0.700-0.800V vs. NHE in the power generation mode in which electric power is supplied to a power load. Therefore, the adsorption of the sulfur onto the platinum catalyst in the cathode occurs due to the reduction reaction although its degree is not so great as a degree of the adsorption in the anode.

To suppress the reduction reaction, the electric potential of each electrode might be set equal to or higher than the oxidization peak in each formula. This allows the oxidization reaction to become predominant and the sulfur adsorbed onto the platinum catalyst to be separated from the platinum catalyst. However, for example, platinum-carrying carbon is typically used as the platinum catalyst layer in the anode. If the electric potential of the anode becomes higher, carbon is destroyed, and $CO_2$ is generated. When the carbon is destroyed, an electron conduction function of the catalyst is impaired and an electric resistance increases. Therefore, to suppress the reduction reaction, control of the electrode potential (electropotential) is accompanied by severe constraints and there causes a need for a significant change of the configuration of the existing fuel cell system.

Under the circumstances, the present inventors paid attention to presence of $H_2O$ in the above formulas and succeeded in preventing the adsorption of the sulfur. Specifically, the present inventors conceived that the adsorption of the sulfur onto the platinum catalyst is suppressed by humidifying each electrode and thereby promoting the rightward oxidization reaction in the above formulas. In addition to this, the present inventors conceived that in the start-up mode of the system, the adsorption of the sulfur onto the platinum catalyst especially in the anode is suppressed effectively by setting a humidification level of the anode higher than a humidification level of the cathode.

More specifically, in the start-up mode, the fuel gas containing hydrogen is supplied to the anode, and the oxidizing gas such as air has been supplied to the cathode. Because of this, at a time point when hydrogen has been supplied to the anode, the electric potential of the anode becomes about 0V vs. NHE, which causes the reduction reaction to occur easily. Accordingly, even in the case where the sulfur-based substances are present in the vicinity of the anode, by setting the humidification level of the anode higher than the humidification level of the cathode in the start-up mode, the reduction reaction can be suppressed and thereby the adsorption of the sulfur onto the platinum catalyst can be prevented. In addition, in the start-up mode, the fuel cell is in a relatively low temperature condition, which can suppress the reduction reaction more effectively.

If the humidification level of the anode is set higher than the humidification level of the cathode, a temperature gradient is formed between the anode and the cathode. Therefore, water which has taken-in the sulfur-based substances in the vicinity of the anode can be transported toward the cathode via the electrolyte and the water containing the sulfur based substances can be discharged according to the discharge of the oxidizing gas.

As described above, in accordance with the polymer electrolyte fuel cell system and the operation method thereof of the present invention, in start-up of the fuel cell system, by setting the humidification level of the anode higher than the humidification level of the cathode, the reduction reaction in which the sulfur is adsorbed onto the catalyst can be suppressed and the sulfur present in the vicinity of the electrode can be discharged. Preferably, the humidification level of the anode is set higher than the humidification level of the cathode so that the anode becomes an excessively humidified state in which a dew point is higher than the temperature of the anode, because condensation of the steam occurs.

A comparison was made between a case where the humidification level of the anode was set higher than the humidification level of the cathode in the start-up mode and another cases. The followings results were obtained. The fuel cell system was started-up in the standby mode and its operation was carried out continuously for 50 hours in the power generation mode. A voltage drop of about 2 mV vs. NHE was observed in the case where full-level humidification start-up was performed in which the anode and the cathode were humidified at the same time, a voltage drop of about 6 mV vs. NHE was observed in the case where the humidification level of the cathode was set higher than the humidification level of the anode, which was the reverse of the present invention in humidification level of the anode and the cathode, and a voltage drop of about 32 mV vs. NHE was observed in the case where the start-up was performed without humidification. By comparison, a voltage drop of only 1 mV vs. NHE was observed in the case where the fuel cell system was started-up in a state in which the humidification level of the anode was set higher than the humidification level of the cathode, and this voltage drop was less than the voltage drops in another cases. This result can support the advantage that the adsorption of the sulfur-based substances to the catalyst can be prevented in accordance with the present invention.

For the purpose of references, conditions in the above experiment in the comparison example will be recited. In the start-up of the fuel cell, a cell temperature was set to 65 degrees C., a relative humidity of the anode was set to 100%, a relative humidity of the cathode was set to 100%, a hydrogen gas was used as the fuel gas, and a nitrogen gas was used as the oxidizing gas, and the fuel cell system were left. Thus, the full-level humidification state was formed. After that, while maintaining the full-level humidification state, the air was used as the oxidizing gas, and an operation was carried out under a load in which a current density was 0.16 A/cm$^2$, and current-voltage measurement was carried continuously for 50 hours. As a result, the above stated voltage drop of about 2 mV vs. NHE occurred in the cell voltage after 50 hours with respect to a cell voltage in initial measurement.

Next, the cell temperature was set to 80 degrees C., the relatively humidity of the anode was set to 100%, the relative humidity of the cathode was set to 53%, and the air was used as the oxidizing gas. And, as in the above case, an operation was carried out under a load in which a current density was 0.16 A/cm$^2$, and current-voltage measurement was carried continuously for 50 hours. As a result, the above stated voltage drop of about 1 mV vs. NHE occurred in the cell voltage after 50 hours with respect to a cell voltage in initial measurement.

Next, the cell temperature was set to 80 degrees C., the relatively humidity of the anode was set to 53%, the relative humidity of the cathode was set to 100%, and the air was used as the oxidizing gas. And, as in the above case, an operation was carried out under a load in which a current density was 0.16 A/cm$^2$, and current-voltage measurement was carried continuously for 50 hours. As a result, the above stated voltage drop of about 6 mV vs. NHE occurred in the cell voltage after 50 hours with respect to a cell voltage in initial measurement.

Furthermore, the cell temperature was set to 80 degrees C., the relatively humidity of the anode was set to 53%, the relative humidity of the cathode was set to 53%, and the air was used as the oxidizing gas. And, as in the above case, an operation was carried out under a load in which a current density was 0.16 A/cm$^2$, and current-voltage measurement was carried continuously for 50 hours. As a result, the above stated voltage drop of about 32 mV vs. NHE occurred in the cell voltage after 50 hours with respect to a cell voltage in initial measurement.

Hereinafter, specific examples of the operation method of the fuel cell system and the configuration of the fuel cell system will be described with reference to the drawings. Hereinafter, throughout the drawings, the same or corresponding components are designated by the same reference symbols, and will not be described in repetition. The present invention is not limited to the embodiments described below.

Embodiment 1

Figure 1:
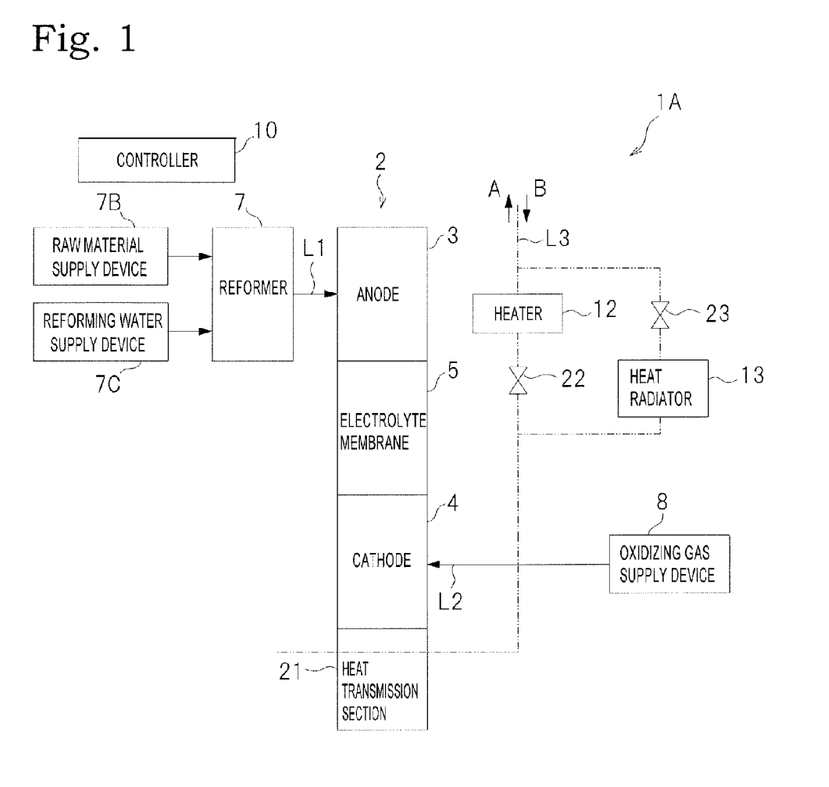
FIG. 1 is a schematic block diagram showing a configuration of a polymer electrolyte fuel cell system according to Embodiment 1 of the present invention.

FIG. 1 is a schematic block diagram showing a configuration of a polymer electrolyte fuel cell system according to Embodiment 1 of the present invention. For easier explanation, in a fuel cell system 1A of FIG. 1, the fuel cell is represented by one power generation cell 2 which is a minimum power generation unit. In the power generation mode, it is necessary to cool the fuel cell by a heat medium, while in the start-up mode, it is necessary to warm-up the fuel cell by the heat medium. A section through which the heat medium flows is expressed as a heat transmission section 21. The heat transmission section 21 is configured to transmit (conduct) heat bidirectionally between the heat medium and the power generation cell 2. As the heat transmission section 21, there are, for example, a separator, a field plate, etc. The fuel cell system 1A of the present embodiment includes a plurality of fuel cell stacks connected to each other in parallel with an outside load. Each of the stacks has a structure in which a plurality of power generation cells 2 and the heat transmission section 21 are stacked together.

As shown in FIG. 1, the fuel cell system 1A includes the power generation cell (fuel cell) 2 including an anode 3 supplied with the fuel gas containing hydrogen, a cathode 4 supplied with the oxidizing gas containing oxygen, and an electrolyte membrane 5 sandwiched between the anode 3 and the cathode 4.

As the electrolyte membrane 5, a polymer membrane having an ion conductivity is used, but its kind is not particularly limited. For example, a hydrocarbon-based electrolyte membrane such as a perfluoro sulfonic acid membrane, a perfluoro phosphoric acid membrane, a perfluoro carboxylic acid membrane, a fluorine-containing hydrocarbon-based graft membrane, a total hydrocarbon-based graft membrane, or a wholly aromatic membrane, may be used. To reduce cost, the hydrocarbon-based electrolyte membrane such as the total hydrocarbon-based graft membrane, or the wholly aromatic membrane, etc., is preferably used. Among these, for the reason of high performance as the electrolyte, the wholly aromatic membrane is preferably used. As an example of the wholly aromatic membrane, there is polyetheretherketone (PEEK). A molecule architecture of the polyetheretherketone (PEEK) is such that a benzene ring is bonded to one of para positions of a particular benzene ring via adamant carbonyl group (—C═O) and another benzene ring is bonded to the other of the para positions of the particular benzene ring via flexible ether bond (—O—).

Each of the anode 3 and the cathode 4 includes two layers, which are for example, a catalyst layer containing a catalyst carrying precious metal such as platinum on carbon particles and a diffusion layer made of a porous material in which gas is diffusible therethrough, such as a carbon cloth. The precious metal contained in the catalyst is not limited to the platinum, but may be another precious metal, or an alloy of containing precious metal. The anode 3 and the cathode 4 may be formed concurrently with formation of an electrode assembly by forming the catalyst layer and the diffusion layer on each of main surfaces of the electrolyte membrane 5. For example, the catalyst layers are formed in such a manner that the catalysts of the electrodes 3 and 4 are dispersed into a liquid containing polymer which becomes the electrolyte membrane 5, a dispersion liquid is applied to the main surfaces of the electrolyte membrane 5, and dried, for example. The diffusion layers are formed on surfaces of the catalyst layers by, for example, pressing the carbon cloth, etc., on surfaces of the catalyst layers. In this way, the electrodes (anode and cathode) 3 and 4 are formed concurrently with formation of the electrode assembly.

The electrode assembly with the electrolyte membrane 5 sandwiched between the anode 3 and the cathode 4 is sandwiched by separators at both sides as the heat transmission sections 21, thereby forming the power generation cell 2. As the separators, calcined carbon or molded carbon which has a high current collecting capability and is relatively stable (inactive) under an oxidization steam atmosphere, or a stainless material coated with precious metal or carbon, etc., is used. On one of a pair of main surfaces of each separator which contacts the electrode assembly, there are formed groove-shaped channels through which the fuel gas or the oxidizing gas flows, while on the other main surface of the separator, there are formed groove-shaped channels through which cooling water as heat medium flows. The channels are connected to fluid supply sources via manifolds (inside manifold or outside manifold: not shown), respectively.

The fuel cell system 1A includes a reformer 7, an oxidizing gas supply device 8, and a controller 10. The reformer 7 includes a reaction container (not shown) accommodating a reforming catalyst or the like, and a heater (not shown). The reaction container is composed of, for example, a reforming section, a shift converter section, and a CO removing section. The reforming section performs steam reforming of the raw material gas to generate a reformed gas. The shift converter section reduces carbon monoxide contained in the reformed gas generated in the reforming section. The CO removing section further reduces the carbon monoxide contained in the reformed gas which has passed through the shift converter section. The heater may be constituted by a burner which combusts a combustion gas such as off-gas of the reformed gas or the raw material gas with the air. During power generation in the fuel cell, processing such as ignition, air supply, etc., occurs in the heater with electric power generated in the fuel cell.

The reformer 7 is supplied with the raw material from the raw material supply device 7A and supplied with reforming water from a reforming water supply device 7B. The reformer 7 generates the reformed gas (fuel gas) which is a hydrogen-containing gas through a steam reforming reaction between the raw material and the reforming water. The reformed gas is defined as a gas containing hydrogen generated by the steam reforming of the raw material gas and containing the hydrogen and the steam.

The reformer 7 is supplied with heat required for the steam reforming reaction from the heater (note that in a case where the reformer 7 employs an auto thermal method, the heater heats the reformer 7 in the start-up mode of the fuel cell system 1A). The reformed gas is supplied to the anode 3 of the power generation cell 2 in each stack through a reformed gas supply line L1, the manifold and the channels. The reformed gas supply line L1 is provided with a fuel shutoff valve (not shown) which opens and closes the reformed gas supply line L1 in response to a control signal from the controller 10.

The raw material supply device 7A is connected to a raw material supply source such as an infrastructure of a city gas (natural gas) and is configured to supply the raw material while adjusting a raw material supply amount in response to the control signal from the controller 10. The raw material supply device 7A is constituted by, for example, a booster and a flow control valve, a plunger pump capable of controlling the flow rate of the raw material, etc. The reforming water supply device 7B is constituted by a plunger pump, etc., using, for example, city water or recovered water as a water source. The reforming water supply device 7B is capable of increasing or decreasing a water supply amount to adjust a humidified state of the fuel gas.

The oxidizing gas supply device 8 is constituted by for example, a known blower, etc., and supplies the air to the cathode 4 of each power generation cell 2 in each stack via an air supply line L2, the manifold and the channels, while adjusting a supply amount of the air which is the oxidizing gas, in response to the control signal from the controller 10. The air supply line L2 is provided with an air shutoff valve (not shown) which opens and closes the air supply line L2 in response to the control signal from the controller 10.

The fuel cell system 1A includes a cooling system having the heater 12, a heat radiator 13 and a cooling water line L3 connecting the heater 12 and the heat radiator 13 to each other. In the cooling system, the cooling water line L3 extends through the heat transmission section 21 in the fuel cell. On the cooling water line L3, there is provided a parallel circuit including the heater 12 and an on-off valve 22 which are connected in series, and an on-off valve 23 and the heat radiator 13 which are connected in series, and the heat transmission section 21 in the fuel cell is located downstream of the parallel circuit in a reverse direction B opposite to a flow direction of the cooling water.

In the fuel cell system 1A, in the power generation mode, the cooling water is flowed in a forward direction A in a state in which the on-off valve 22 is closed and the on-off valve 23 is opened, and the heat radiator 13 radiates heat from the cooling water which has cooled the power generation cell 2 and has increased its temperature in the heat transmission section 21, so that the temperature of the cooling water is lowered. By comparison, in the start-up mode, the cooling water is flowed in the reverse direction B in a state in which the on-off valve 22 is opened while the on-off valve 23 is closed, and the cooling water which has been heated by the heater 12 and has increased its temperature flows through the heat transmission section 21 in the fuel cell to warm-up the power generation cell 2. In this way, the fuel cell is warmed-up.

In FIG. 1, the cooling water line L3 in the cooling system is not formed in a loop form. However, as well known, the cooling water line L3 may be formed in a loop form, a tank and a pump are provided on the cooling water line L3, and the pump may circulate the cooling water stored in the tank through the cooling water line L3. In this case, a direction of a pressure applied by the pump is switched so that the cooling water is circulated in the forward direction A or in the reverse direction B.

The configuration of the fuel cell system 1A of FIG. 1 has been described above. The fuel cell system 1A includes components in addition to the components shown in FIG. 1. However, the components which are not shown may be known components and will not be described in detail.

Figure 2:
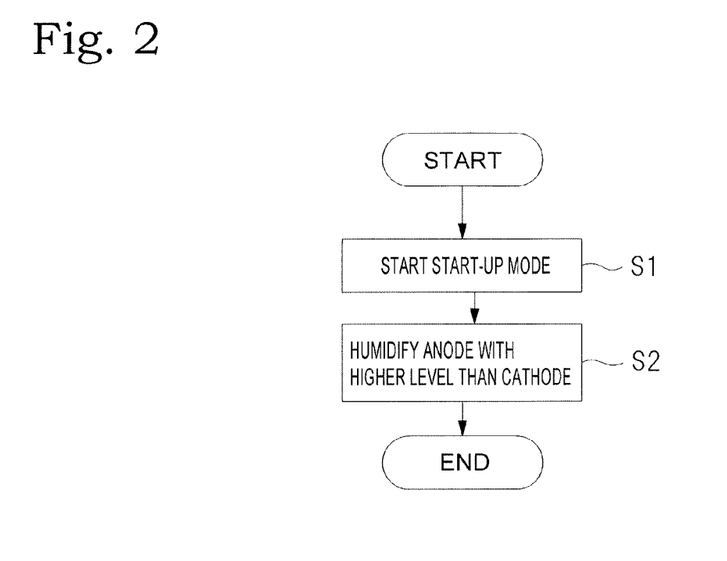
FIG. 2 is a flowchart showing an operation method of a fuel cell system according to an embodiment of the present invention.

Next, the operation method of the fuel cell system 1A according to the present embodiment will be described with reference to a flowchart of FIG. 2. As shown in FIG. 2, when the fuel cell system 1A enters start-up mode (step S1), the anode 3 is humidified with a higher level than the cathode 4 (step S2). More preferably, the anode 3 is excessively humidified. The phrase "the anode 3 is humidified with a higher level than the cathode 4" means that a relative humidity of the gas introduced into the anode 3 is made higher than a relative humidity of the gas introduced into the cathode 4.

More specifically, when the fuel cell system 1A enters the start-up mode to switch from the standby mode to the power generation mode (step S1), the reformer 7 supplies the fuel gas to the anode 3 and the oxidizing gas supply device 8 supplies the air which is the oxidizing gas to the cathode 4. To be in greater detail, the heater which is not shown is ignited and the reformer 7 is activated, and the raw material supply device 7A and the reforming water supply device 7B are actuated to supply the raw material and the reforming water, respectively. Note that in this situation, the reformed gas output from the reformer 7 is not supplied to the anode 3 but is returned to the heater via a reformed gas bypass line which is not shown. When a temperature of the reformer 7 increases and reaches a predetermined temperature or higher, supplying of the reformed gas to the anode 3 is initiated. To prevent the catalyst from being poisoned by a CO gas, the predetermined temperature may be 500 degrees C., preferably 600 degrees C., more preferably 650 degrees C., and most preferably 700 degrees C.

At this time, intentional humidification is not performed for the air which is the oxidizing gas, but a water supply amount (steam supply amount) of the reforming water supply device 7B is increased to humidify the fuel gas. This allows the anode 3 to be humidified with a higher level than the cathode 4 (step S2). More preferably, the anode 3 is excessively humidified.

By performing this operation method, the anode 3 is humidified with a higher level than the cathode 4 in the start-up mode. This makes it possible to suppress the reduction reaction in which the sulfur is adsorbed onto the anode 3, and discharge the sulfur present near the anode 3.

The temperature of the power generation cell 2 at which step S2 is performed may be a room temperature or a temperature (e.g., about 100 degrees) in the case where the fuel cell system 1A is operated in the power generation mode. The operation in step S2 may be implemented by controlling the operation of the reforming water supply device 7B in response to the control signal from the controller 10, or implemented by an operator's manual operation.

Although the intentional humidification is not performed for the oxidizing gas (air) which is the oxidizing gas, in step S2, the humidified oxidizing gas may be supplied to the cathode 4 so long as the anode 3 is humidified with a higher level than the cathode 4.

After humidifying the anode 3 in step S2, the humidification operation for the anode 3 may be finished at a time point when the fuel cell system 1A shifts to the power generation mode. If the temperature of the power generation cell 2 in the power generation mode is set higher than the dew point set to correspond to the humidification for the anode 3, the anode 3 will not become excessively humidified in shifting to the power generation mode. Therefore, it is not necessary to finish the humidification operation for the anode 3 intentionally.

Embodiment 2

Figure 3:
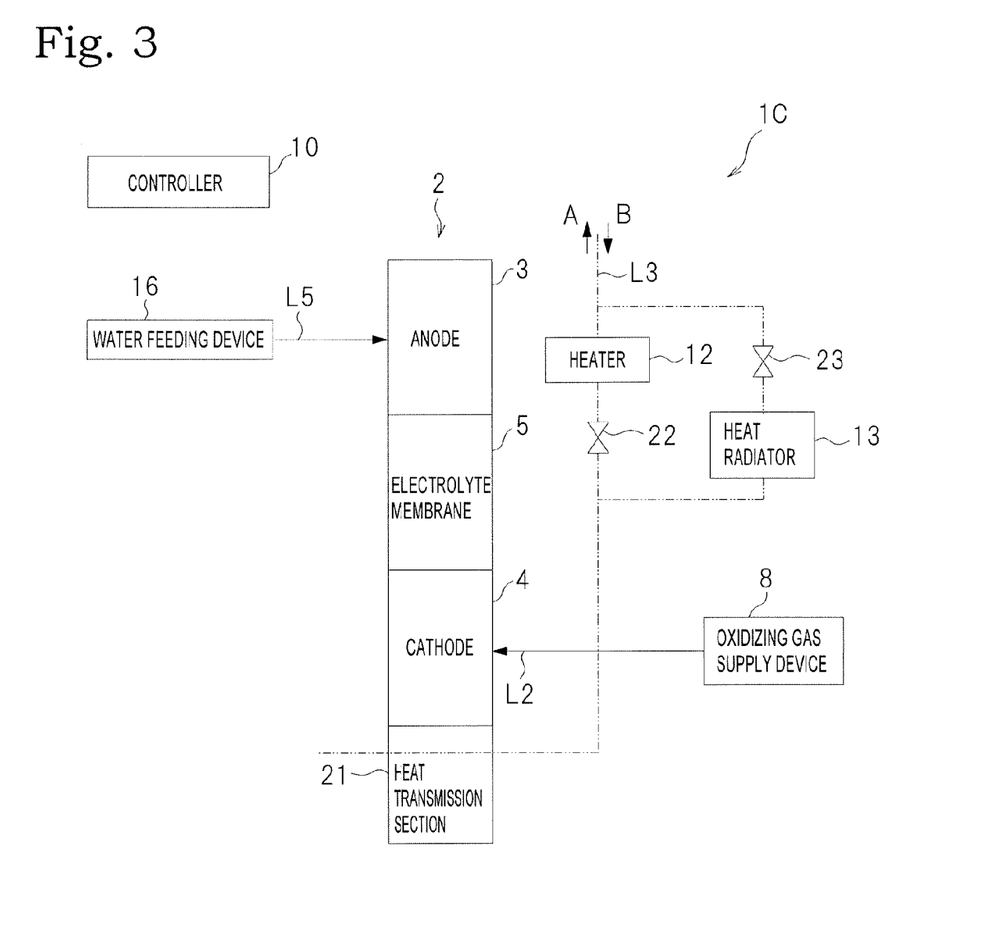
FIG. 3 is a schematic block diagram showing a configuration of a polymer electrolyte fuel cell system according to Embodiment 2 of the present invention.

FIG. 3 is a schematic block diagram showing a configuration of a polymer electrolyte fuel cell system according to Embodiment 2 of the present invention. As can be understand from a comparison between the configuration of FIG. 1 and the configuration of FIG. 3, a configuration for humidifying the anode 3 in the fuel cell system 1A is changed in a fuel cell system 1C of the present embodiment.

More specifically, the fuel cell system 1C includes a water feeding device 16 and a water feeding line L5 connecting the water feeding device 16 to the anode 3 of the power generation cell 2, and is configured to directly supply the water from the water feeding device 16 to the anode 3 via the water feeding line L5. Although not shown, the fuel cell system 1C includes components similar to the raw material supply device 7A, the reforming water supply device 7B and the reformer 7 in the fuel cell system 1A to supply the reformed gas to the anode 3.

The fuel cell system 1C is basically operated according to a procedure similar to that shown in the flowchart of FIG. 2. The detail of the procedure will be described. When the fuel cell system 1A enters the start-up mode to switch from the standby mode to the power generation mode (step S1), the fuel gas is supplied to the anode 3 and the air which is the oxidizing gas is supplied to the cathode 4. At this time, intentional humidification is not performed for the air which is the oxidizing gas, but the water is directly supplied from the water feeding device 16 to the anode 3 to humidify the fuel gas. This allows the anode 3 to be humidified with a higher level than the cathode 4 (step S2), to be humidified excessively, preferably.

By performing this operation method, the anode 3 is allowed to have a humidified state with a higher level than the cathode 4. Therefore, the reduction reaction in which the sulfur is adsorbed onto the anode 3 can be suppressed and the sulfur present in the vicinity of the anode 3 can be discharged.

After humidifying the anode 3 in step S2, the humidification operation for the anode 3 may be finished at a time point when the fuel cell system 1C shifts to the power generation mode. If the temperature of the power generation cell 2 in the power generation mode is set higher than the dew point set to correspond to the humidification for the anode 3, the anode 3 will not become excessively humidified in shifting to the power generation mode. Therefore, it is not necessary to finish the humidification operation for the anode 3 intentionally.

Embodiment 3

Figure 4:
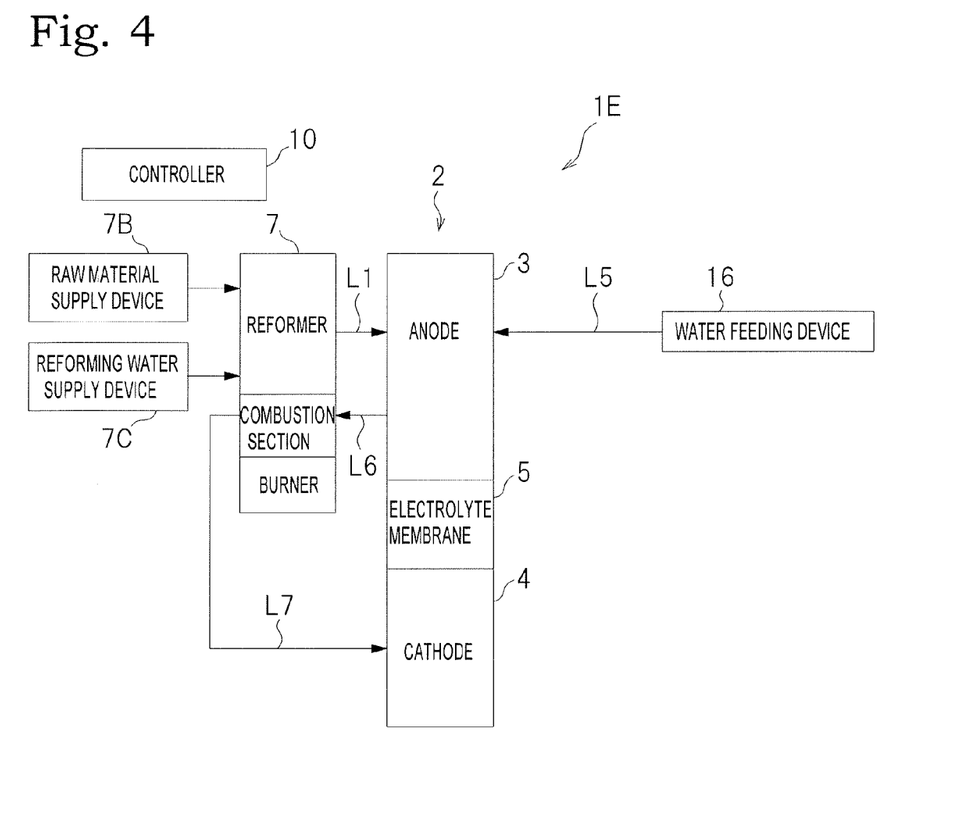
FIG. 4 is a schematic block diagram showing a configuration of a polymer electrolyte fuel cell system according to Embodiment 3 of the present invention.

FIG. 4 is a schematic block diagram showing a configuration of a polymer electrolyte fuel cell system according to Embodiment 3 of the present invention. As can be understand from a comparison between the configuration of FIG. 1 and the configuration of FIG. 3, a configuration for humidifying the anode 3 and the cathode 4 in the fuel cell system 1A is changed in a fuel cell system 1E of the present embodiment.

More specifically, like the fuel cell system 1A, the fuel cell system 1E includes the reformer 7, the raw material supply device 7A, and the reforming water supply device 7B, and is capable of adjusting a humidified state of the fuel gas by increasing/decreasing a water supply amount of the reforming water supply device 7B. As known, the reformer 7 includes a reforming reaction section 71 and a combustion section (e.g., burner) 72. The fuel cell system 1E includes an off-gas line L6 through which an off-gas discharged from the anode 3 is led to the combustion section 72 and a combustion gas line L7 through which a combustion gas generated by combusting the off-gas is led from the combustion section 72 to the cathode 4. The combustion gas generated by combusting the off-gas ($H_2$) is used to humidify the cathode 4. Although not shown, as a matter of course, the fuel cell system 1E includes the components similar to the oxidizing gas supply device 8 and the cooling system in the fuel cell system 1A.

The fuel cell system 1E is basically operated according to a procedure similar to that shown in the flowchart of FIG. 2. The detail of the procedure will be described. When the fuel cell system 1E enters the start-up mode to switch from the standby mode to the power generation mode (step S1), the fuel gas is supplied to the anode 3 and the air which is the oxidizing gas is supplied to the cathode 4. At this time, intentional humidification is not performed for the air which is the oxidizing gas, but the water is directly supplied from the water feeding device 16 to the anode 3 to humidify the fuel gas. This allows the anode 3 to be humidified with a higher level than the cathode 4 (step S2), humidified excessively, preferably.

Then, after a passage of a predetermined time after step S2, the combustion gas (steam) generated by combusting the off-gas in the combustion section 72 is supplied to the cathode 4 via the combustion gas line L7. This allows the cathode 4 to be humidified, more preferably, excessively humidified.

By performing this operation method, the anode 3 can have a humidified state with a higher level than the cathode 4 in the start-up mode. This makes it possible to suppress the reduction reaction in which the sulfur is adsorbed onto the anode 3, and discharge the sulfur present near the anode 3.

Embodiment 4

Figure 5:
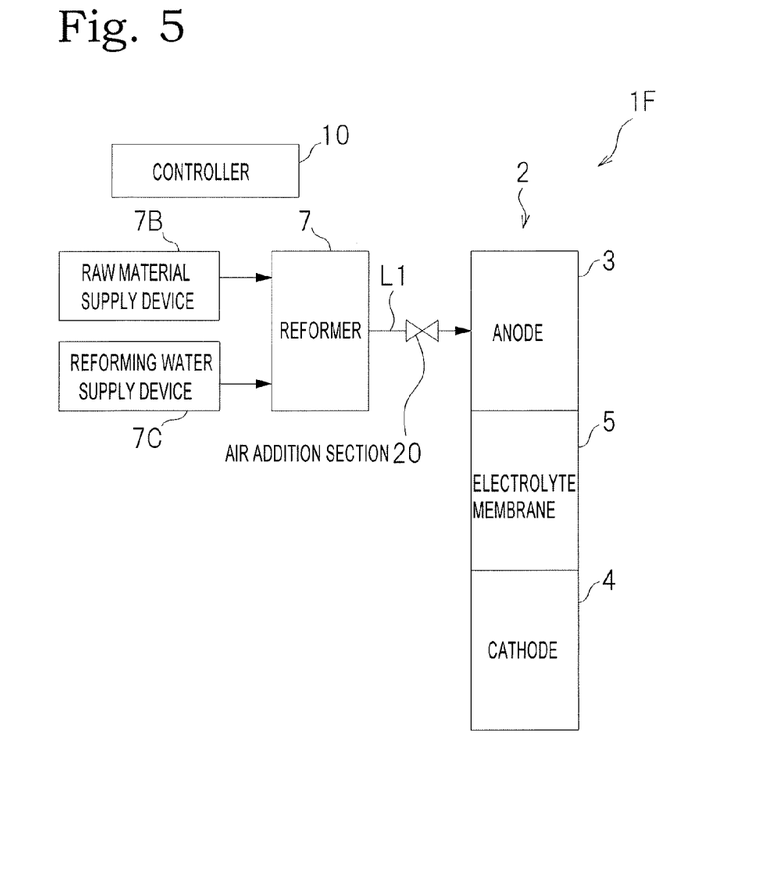
FIG. 5 is a schematic block diagram showing a configuration of a polymer electrolyte fuel cell system according to Embodiment 4 of the present invention.

FIG. 5 is a schematic block diagram showing a configuration of a polymer electrolyte fuel cell system according to Embodiment 4 of the present invention. As can be understand from a comparison between the configuration of FIG. 1 and the configuration of FIG. 5, a fuel cell system 1F of the present embodiment has a configuration similar to that of the fuel cell system 1A, and further includes an air addition section 20 at a portion of the reformed gas supply line L1 connecting the reformer 7 to the anode 3. The air supply section 20 is constituted by a known pump, a known electromagnetic valve, etc. The air addition section 20 is actuated in response to a control signal from the controller 10 and is configured to introduce outside air into the reformed gas supply line L1. Although not shown in FIG. 5, as a matter of course, the fuel cell system 1F includes the components similar to the oxidizing gas supply device 8 and the cooling system in the fuel cell system 1A.

In the fuel cell system 1F configured as described above, the operation in the start-up mode is performed according to the procedure (see Embodiment 1) similar to that of the fuel cell system 1A. In addition, in step S2 of FIG. 2, the air addition section 20 adds the air to the fuel gas humidified with a higher level to be supplied from the reformer 7 to the anode 3. Thereby, in the anode 3, the hydrogen contained in the fuel gas and the oxygen contained in the added air exist. By the same reasoning as the reasoning in which the electric potential of the cathode 4 in which the hydrogen and the oxygen are reacted with each other becomes higher than 0V vs. NHE, the electric potential of the anode 3 can be increased.

A ratio of the oxygen gas to be contained in the reformed gas is, for example, preferably about 1%~5% with respect to a volume of the reformed gas, more preferably about 1%~3% and most preferably about 1%~2%. Thus, by introducing the reformed gas containing a little amount of oxygen into the anode 3, it is possible to further prevent the anode 3 from being poisoned by the sulfur-based substances.

The reason is as follows.

The standard electrode potential of the oxygen is about 1V vs. NHE. Therefore, by introducing the oxygen gas to the anode 3, the electric potential of the anode 3 becomes about 1V vs. NHE. Because of this, a rightward reaction in the above stated formula (1) proceeds. As a result, the adsorption of the sulfur-based substances to the anode 3 can be suppressed.

On the other hand, if the electric potential of the anode 3 is set to about 1V vs. NHE, durability of the fuel cell is degraded. The reason is as follows.

The catalyst layer constituting the anode 3 contains an alloy of Pt and Ru. When the catalyst layer is placed in an environment of 0.6V vs. NHE or higher, Ru is ionized and Ru ions are eluted from the alloy. The eluted Ru ions will poison the electrolyte membrane 5. As a result, the electrolyte membrane 5 will be degraded, and durability of the fuel cell will be degraded.

Because of this, by introducing the reformed gas containing a little amount of oxygen gas to the anode 3 instead of introducing the oxygen gas alone into the anode 3, it is possible to increase the standard electric potential of the anode 3 while preventing it from becoming 0.6V vs. NHE or higher. This makes it possible to prevent the electrolyte membrane 5 from being poisoned by Ru while suppressing the adsorption of the sulfur to the anode 3.

A timing at which the operation (oxygen addition operation) for adding oxygen to the reformed gas can be suitably set appropriately. For example, in a case where it is determined that the anode 3 has been poisoned by the sulfur in the middle of an operation of the fuel cell, the oxygen addition operation may be performed in next start-up. It may be determined that the anode 3 has been poisoned by the sulfur based on, for example, the fact that the voltage of the fuel cell becomes less than the predetermined value, or the fact that a rate of a decrease in the voltage of the fuel cell which occurs with an increase in an accumulated operation time of the fuel cell becomes greater than a predetermined value.

The oxygen addition operation may be performed on a regular basis, or on an irregular basis (at random). For example, a frequency with which the oxygen addition operation is performed, or an added amount of oxygen may be increased with an increase in the accumulated operation time.

Thus, in the fuel cell system 1F of the present embodiment, the anode 3 is humidified with a higher level than the cathode 4, and the electric potential of the anode 3 is increased. Therefore, the reduction reaction in which the sulfur is adsorbed onto the anode 3 can be suppressed more effectively. Although in the present embodiment, the air addition section 20 is added to the fuel cell system 1A, the present invention is not limited to this. The air addition section 20 may be added to the fuel cell system 1C or 1E. In this case, the same advantages as those described above can be achieved.

Embodiment 5

Figure 6:
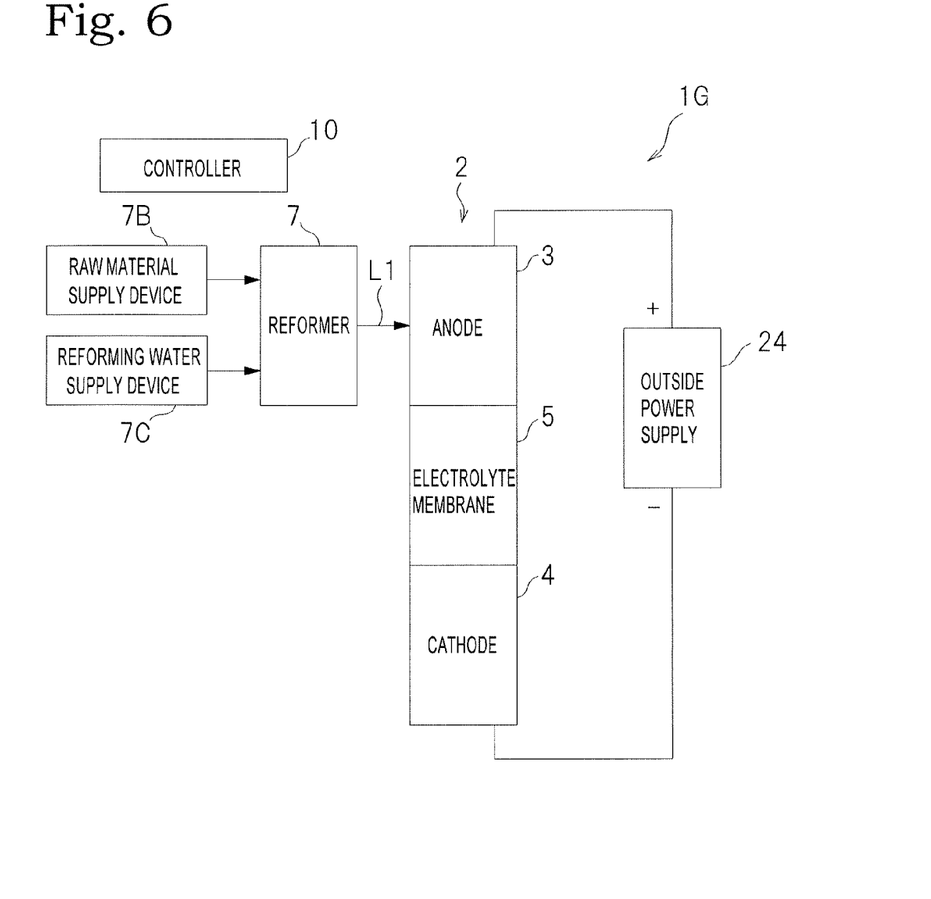
FIG. 6 is a schematic block diagram showing a configuration of a polymer electrolyte fuel cell system according to Embodiment 5 of the present invention.

FIG. 6 is a schematic block diagram showing a configuration of a polymer electrolyte fuel cell system according to Embodiment 5 of the present invention. As can be understand from a comparison between the configuration of FIG. 1 and the configuration of FIG. 6, a fuel cell system 1G of the present embodiment has a configuration similar to that of the fuel cell system 1A, and further includes an outside power supply 24 connected to the power generation cell 2 such that the electric potential of the anode 3 is higher than the electric potential of the cathode 4. The power generation cell 2 is selectively connectable to the outside power supply 24 or to a utility power supply via a switch which is not shown. This selective connection operation performed by the switch is controlled by the controller 10. A voltage applied by the outside power supply 24 to the power generation cell 2 is ON/OFF controlled by a switching element (not shown) actuated by the controller 10.

Although not shown in FIG. 5, as a matter of course, the fuel cell system 1G includes the components similar to the oxidizing gas supply device 8 and the cooling system in the fuel cell system 1A.

In the fuel cell system 1G configured as described above, the operation in the start-up mode is performed according to the procedure (see Embodiment 1) similar to that of the fuel cell system 1A. In addition, in step S2 of FIG. 2, the fuel gas humidified with a higher level is supplied from the reformer 7 to the anode 3 under a state in which the voltage is applied by the outside power supply 24 to the power generation cell 2.

Thus, the anode 3 is humidified with a higher level than the cathode 4, and the electric potential of the anode 3 is increased. Therefore, the reduction reaction in which the sulfur is adsorbed onto the anode 3 can be suppressed more effectively. Although in the present embodiment, the configuration for increasing the electric potential of the anode 3 by using the outside power supply 24 in the fuel cell system 1A has been described, the present invention is not limited to this. The similar configuration is applicable to the fuel cell system 1C, 1E or 1F. Also, in this case, the same advantages as those described above can be achieved.

Embodiment 6

In an operation method of a polymer electrolyte fuel cell system of the present embodiment, the anode 3 is humidified with a higher level than the cathode 4 in the standby mode of the fuel cell system (see step S2 in FIG. 2). This operation method is applicable to any one of the above stated fuel cell systems 1A, 1C, 1E, 1F, and 1G A specific procedure for making the anode 3 humidified with a higher level is the same as those described in the embodiments corresponding to the fuel cell systems 1A, 1C, 1E, 1F, and 1G.

By performing this operation method, the sulfur-based substances can be removed in advance in the standby mode before the fuel cell system enters the start-up mode. Therefore, the adsorption of the sulfur onto the anode 3 in the operation in the start-up mode can be suppressed more effectively.

Embodiment 7

In an operation method of the polymer electrolyte fuel cell system according to the present embodiment, in the power generation mode, the fuel cell system is operated with a predetermined power output lower than a rated power generation output, and in this low power output operation state, the anode 3 is humidified with a higher level than the cathode 4 (see step S2 in FIG. 2). This operation method is applicable to any one of the above stated fuel cell systems 1A, 1C, 1E, 1F, and 1G A specific procedure for making the anode 3 humidified with a higher level is the same as those described in the embodiments corresponding to the fuel cell systems 1A, 1C, 1E, 1F, and 1G.

By performing this operation method, an amount of water generation in the cathode can be reduced in the low power output state with a level equal to or lower than a particular power output level. Therefore, by making the fuel gas humidified excessively, the anode 3 can have a humidified state with a higher level than the cathode 4. As a result, during the power generation operation, the sulfur-based substances adsorbed onto the anode 3 can be taken out into the water in the vicinity of the anode, and this water can be transported toward the cathode 4 via the electrolyte and can be discharged to outside the fuel cell.

Embodiment 8

In addition to the above stated operation method, the following method may be employed. For example, in a fuel cell system for which long durable years are assumed, adsorption of the sulfur onto the electrode which progresses over a long-period operation is unavoidable. Accordingly, even in the middle of the rated operation of the fuel cell system, the fuel cell system is shut down once, and is placed in the standby mode in a full-level humidification state. Thereafter, the anode 3 is humidified with a higher level than the cathode 4 like the above step S2 of FIG. 2. And, the fuel cell system is re-started-up, and is shifted to the power generation mode.

In the above described manner, the oxidization reaction in the anode 3 is promoted. Therefore, the adsorbed sulfur can be removed, the anode 2 can be refreshed, and an output voltage of the system can be restored. If the restoration of the output voltage, or decrease of an elution speed of the fluoride ions can be confirmed before and after such an operation, then a possibility that the anode 3 was poisoned by the sulfur can be evaluated by self-diagnosis.

In a case where the fuel cell system having been operated in the power generation mode is shut down, and thereafter is re-started-up relatively sooner for some reasons or other, adsorption of the sulfur onto the anode 3 can be adsorbed effectively by starting-up the fuel cell system in the state where the anode 3 is humidified with a higher level. Specifically, in the case where the fuel cell system in the power generation mode is shut down and then is re-started up sooner, the power generation cell 2 enters the start-up mode in a relatively high temperature condition. In this state, therefore, the reduction reaction is promoted and the sulfur is easily adsorbed onto the anode 3. By starting-up the fuel cell system by employing the operation method of the present invention, the reduction reaction can be suppressed and hence poisoning of the electrode due to the adsorption of the sulfur can be prevented.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is applicable to an operation method of a polymer electrolyte fuel cell system which is capable of preventing an electrode from being poisoned by a sulfur-based compound in a start-up state, and the polymer electrolyte fuel cell system.

REFERENCE SIGNS LISTS 1A fuel cell system
1C fuel cell system 1E fuel cell system
1F fuel cell system
1G fuel cell system
2 power generation cell (fuel cell)
3 anode
4 cathode
5 electrolyte membrane
7 reformer
7A raw material supply device
7B reforming water supply device
8 oxidizing gas supply device
10 controller
12 heater
13 heat radiator
15, 16 water feeding device
71 reforming reaction section
72 combustion section
73 burner

The invention claimed is:

1. A method of operating a polymer electrolyte fuel cell system including an anode supplied with a fuel gas containing hydrogen, a cathode supplied with an oxidizing gas containing oxygen, and a polymer electrolyte membrane sandwiched between the anode and the cathode, the anode including a catalyst layer containing Ru, the method comprising:
in start-up of the polymer electrolyte fuel cell system, supplying to the anode the fuel gas humidified with a higher level than the oxidizing gas and an oxygen gas which is 1% to 5% with respect to a volume of the fuel gas and to the cathode the oxidizing gas to cause the anode to have a humidified state with a higher level than the cathode.

2. The method of operating the polymer electrolyte fuel cell system according to claim 1, comprising:
when it is determined that the anode has been poisoned by sulfur, supplying to the anode the fuel gas humidified with the higher level than the oxidizing gas and an oxygen gas, to cause the anode to have the humidified state with the higher level than the cathode, in next start-up after it is determined that the anode has been poisoned by the sulfur.

3. The method of operating the polymer electrolyte fuel cell system according to claim 1, wherein in the start-up, water is also supplied to the anode in addition to the humidified fuel gas.

4. The method of operating the polymer electrolyte fuel cell system according to claim 1, comprising:
in the start-up, causing the anode to have the humidified state with the higher level than the cathode, in a state in which the anode is caused to have a predetermined electric potential higher than a standard hydrogen electrode potential using an outside power supply.

5. The method of operating the polymer electrolyte fuel cell system according to claim 1, comprising:
in a standby state of the polymer electrolyte fuel cell, causing the anode to have the humidified state with the higher level than the cathode.

6. The method of operating the polymer electrolyte fuel cell system according to claim 1, comprising:
causing the anode to have the humidified state with the higher level than the cathode, in a state in which the polymer electrolyte fuel cell system is operated with a predetermined power output lower than a rated power generation output.

7. The method of operating the polymer electrolyte fuel cell system according to claim 1,
wherein the supplying to the anode the fuel gas humidified with a higher level than the oxidizing gas includes increasing a water supply amount of a reforming water supply device for supplying reforming water, from which steam is generated so that the steam reacts with raw material gas to generate the fuel gas, to a reformer.

8. The method of operating the polymer electrolyte fuel cell system according to claim 1,
wherein an amount of the oxygen gas is 1% to 3% with respect to a volume of the fuel gas.

* * * * *